United States Patent Office 3,312,635
Patented Apr. 4, 1967

3,312,635
CHEMICAL PROCESS AND CATALYST THEREFOR
Alfonso Maria Liquori, Palazzo Arcate, Naples, Italy, assignor to Colgate-Palmolive Company, New York, N.Y., a corporation of Delaware
No Drawing. Original application Feb. 6, 1963, Ser. No. 256,555, now Patent No. 3,280,207, dated Oct. 18, 1966. Divided and this application Mar. 4, 1966, Ser. No. 531,778
6 Claims. (Cl. 252—470)

This application is a division of my copending application Ser. No. 256,555 filed Feb. 6, 1963, now Patent No. 3,280,207.

This invention relates to new nickel oxide-molybdenum oxide catalysts and to a process for preparing such catalysts.

An object of this invention is to provide novel non-stoichiometric nickel oxide-molybdenum oxide catalysts useful for catalyzing various processes such as aromatization, disproportionation, oligomerization and polymerization. Another object is to prepare the novel catalysts by a simple and convenient method, namely the decomposition of a crystallizable and water-soluble ammonium nickel molybdate $(NH_4)_6NiMo_9O_{32} \cdot 6H_2O$ which can be easily prepared and supported on a suitable carrier. Additional objects will appear from the following description of the invention.

In accordance with the invention the catalyst comprises an association of nickel oxide and molybdenum oxide containing from about 8 to about 40 percent by weight of $MoO_3$ and from about 0.4 to about 8 percent by weight of nickel oxide (based upon the weight of the supported catalyst) in which nickel and molybdenum are present in an atomic ratio of 1:9 respectively formed by thermal decomposition of the black crystalline soluble complex $2(NH_4)_6NiMo_9O_{32} \cdot 6H_2O$ at a temperature between 450° C. and about 550° C., preferably of about 500° C., for 10 to 30 hours, preferably for 20 hours. It is noteworthy that in the aforesaid complex, nickel is present in the unusual tetravalent state.

An X-ray powder diffraction photograph of nickel oxide-molybdenum oxide obtained as indicated above shows that it is a homogeneous single phase and not a mechanical mixture of the two component oxides. Data from the diffraction photograph are given below in Table I.

TABLE I.—SPACINGS (d) IN A. OF DIFFERENT NICKEL OXIDES AND MOLYBDENUM OXIDES

| $MoO_3$ [a] | New Catalyst [b] | Mechanical Mixture [c] | NiO [d] |
|---|---|---|---|
| 2.804 W | 2.795 W | 2.804 S | |
| 1.585 S | 1.579 S | 1.605 M | |
| 1.456 M | 1.453 M | 1.469 S | |
| 1.377 VS | 1.371 VS | 1.388 VS | |
| 1.151 M | 1.169 M | 1.152 W | |
| 1.102 W | 1.097 W | 1.106 W | |
| | | | 1.059 S |
| 1.024 S | 1.022 S | 1.027 M | |
| | | .937 W | 0.943 VS |
| .907 W | .904 W | .905 S | |
| .864 W | .862 W | .866 W | |
| .828 M | .827 W | .828 W | |
| 0.806 W | .804 W | .807 M | |
| 0.798 W | .796 W | .798 W | |
| 0.789 W | .787 W | .788 W | |
| 0.780 W | .779 W | .781 W | |
| | | .763 W | .757 VS |
| 0.750 W | .749 W | .749 W | |
| 0.732 W | .734 W | .733 W | |

W=weak; M=medium; S=strong; VS=very strong.
[a] Molybdenum oxide obtained by decomposing paraammonium molybdate $(NH_4)_6Mo_7O_{24} \cdot 4H_2O$ at 550° C.
[b] Nickel oxide-molybdenum oxide catalyst of this invention; obtained as described above from ammonium nickel molybdate $(NH_4)_6NiMo_9O_{32} \cdot 6H_2O$.
[c] Nickel oxide and molybdenum oxide obtained by decomposing a mixture of ammonuim para-molybdate and nickel nitrate (9:1, respectively, by weight) at 550° C.
[d] Nickel oxide.

The new catalysts contemplated herein can be used in a number of reactions, such as for converting limonene and other hydrocarbons to 3-p-menthene and p-cymene. They can also be used for disproportionating, aromatizing, oligomerizating, polymerizing, etc. hydrocarbons; that is, for reactions conducted in contact with a transition metal oxide catalyst, that is, the oxides of chromium, nickel, and molybdenum.

Although it is well known that molybdenum catalysts can be activated only by reduction with hydrogen, it has been found that our nickel oxide-molybdenum oxide catalysts can be activated with air at 500° C. and that such catalysts exhibit a high catalytic activity.

The following examples show various uses of the nickel-molybdenum oxide catalysts of the invention. In these examples the nickel oxide-molybdenum oxide catalyst was always activated in an air stream at 500° C. Reaction products were identified by means of Vapor Phase Chromatography and Infra Red Spectrography. The silica-alumina supports were prepared as follows: 125 ml. of sodium silicate (containing 0.365 g. $SiO_2$/ml.), diluted with 400 ml. of water, were cooled at 5° C. and added to a cold solution of 22.4 g. of $Al_2(SO_4)_3 \cdot 18H_2O$ in 70 ml. of water and 33 ml. of HCl 4 N with strong stirring. A gel was obtained immediately, which was allowed to age for 48 hours. Then it was washed three times for 2 hour periods with a 2% aluminum sulfate solution and with water until free of sulfate ions, dried for 4 hours at 140–160° C. and finally calcinated for 10 hours at about 500° C. At this point it was crushed to give particles with a diameter of about 2–3 mm.

Disproportionation and aromatization reactions of limonene, in continuous and batch operations, are shown in Examples 1 through 4.

*Example 1*

30.6 parts by volume of d-limonene ($d$=0.842) were passed during a 10 minute period through a reactor containing 85 parts by volume of a fixed bed of the nickel-molybdenum oxide catalyst (30 percent by weight of $MoO_3$) supported on silica-alumina. The conventional space velocity was 2.16 volume d-limonene/hour/volume of catalyst. Temperature was about 350° C. Reaction products, refrigerated by means of a Liebig condenser, were collected, weighed, and separated preferably in two steps. The first step involved simple distillation to eliminate any products formed by cracking of d-limonene, and the second step involved chromatography on silica gel. In this way, substantially complete separation of 3-p-methene and trans-p-menthane from p-cymene was realized. The presence of trans-p-menthane does not affect the subsequent anti-Markownikoff hydration of 3-p-menthene. Analysis was made with Vapor Phase Chromotography and Infra Red Spectrography apparatuses.

The weight of reaction product was 24 parts, with a total reaction yield of about 93 percent. Distribution of product included:

|  | Percent |
|---|---|
| 3-p-menthene | 19 |
| 1-p-menthene | 8 |
| p-Cymene | 65 |

Catalyst was washed with 30 parts by volume of cyclohexane and reactivated at 500° C. for 5 hours in an air stream.

The preparation and analysis of the catalyst were as follows. For the preparation of the soluble nickel molybdate with a ratio of Ni/Mo of 1/9, the nickel being in a tetravalent state, 22 milliliters of a 7% $NiSO_4$, 22 milliliters of 30% $(NH_4)_2S_2O_8$ and 50 milliliters of 25% ammonium paramolybdate solution were heated separately at ebullition and then were mixed together. The resulting olution was black in color. A precipitate which formed was then filtered and cooled. Black crystals were separated, washed with cold water and purified by recrystallization from water.

The supported catalyst was prepared by impregnating the carrier, silica-alumina, with an aqueous solution of ammonium nickel molybdate $(NH_4)6NiMo_9O_{32} \cdot 6H_2O$, in calculated amounts in order to obtain a catalyst containing about the desired percentage of $MoO_3$. This mixture was heated in a water bath until the catalyst was dried. Then it was dried at 200° C. for 5 hours and activated at 500° C. in an air stream for 20 hours in order to obtain the corresponding oxides.

A transition into a lower valence state of molybdenum takes place during the reaction of limonene to 3-p-menthene and p-cymene. The final valence state of molybdenum after one run over the catalyst was about 5.7 instead of 6. Analysis of the total molybdenum content was carried out by weighing about 0.2 gram of finely ground catalyst. The catalyst was added to 100 milliliters of $H_2SO_4$ (9 normal) and 5 milliliters of orthophosphoric acid (85%; $d=1.71$). The resulting mixture was heated for 30 minutes in order to solubilize all of the molybdenum. The solid white residue which formed was filtered and washed several times with hot water. The resulting aqueous solution was dropped slowly through a column containing zinc amalgam to reduce molybdenum. The column was then washed with 200 milliliters of $H_2SO_4$ (1 normal) and with 100 milliliters of water. The washings were collected in an Erlenmeyer flask containing 30 milliliters of ferric alum (10%) and 4 milliliters of $H_3PO_4$ (85%) and titrated with ceric sulphate (0.1 normal). The final color of the solution should be light yellow. The determination of molybdenum valence after the reaction with limonene was carried out by adding 0.2 gram of catalyst to 25 milliliters of $H_2SO_4$ (1:1). The resulting mixture was heated for 30 minutes. A solid residue which formed was filtered and was washed with hot water. To the hot water extracts, 25 milliliters of ceric sulphate (0.1 normal) were added. The mixture which formed was allowed to stand at room temperature (22° C.) for four days, being stirred occasionally. This time interval proved sufficiently long for oxidation of molybdenum. Excess ceric ions were determined by titration with a solution of ferrous salt (0.1 normal), using ortho-phenantroline as an indicator. Color change was from yellow to red.

Example 2

24.9 parts by volume of d-limonene were passed during a 92 minute period through a reactor containing a fixed bed of the nickel-molybdenum oxide catalyst (approximately 8% $MoO_3$) supported on silica-alumina. Conventional space velocity was 0.27 vol./hour/vol. Temperature was about 300° C. Weight of reaction product was 13 parts. Total reaction yield was about 62 percent, product distribution including:

| | Percent |
|---|---|
| 3-p-menthene | 10 |
| Trans-p-menthane | 12 |
| p-Cymene | 24 |

The amount of 1-p-menthene was practically negligible (0.29%). Almost all cracking products boiling below 100° C. were readily removed by simple distillation.

The catalyst was washed with cyclohexane and reactivated at 500° C. for 10 hours in an air stream.

Example 3

37.4 parts by volume of d-limonene were passed during a 52 minute period through a reactor. The latter contained 100 parts by volume of the nickel oxidemolybdenum oxide catalyst supported on alumina. This catalyst contained about 8.4 percent of $MoO_3$. The conventional space velocity was 0.43 vol./hour/vol. and the temperature was about 310° C. The weight of the reaction products was 26.5 parts. Total reaction yield was about 84%. Distribution of products included:

| | Percent |
|---|---|
| 3-p-menthene | 7.5 |
| 1-p-menthene | 4.6 |
| Trans-p-menthane | 1.7 |
| p-Cymene | 70 |

The catalyst was washed with cyclohexane and reactivated at 500° C. for 5 hours in air stream. In this case the carrier, alumina, imparted aromatizing characteristics to the catalyst. This is shown by the high yield of p-cymene, shown above.

Example 4

In a batch operation, an autoclave containing 10 parts by weight of d-limonene, 8 parts by weight of benzene serving as a solvent, and 0.4 part (weight) of the nickel oxide-molybdenum oxide catalyst supported on silica-alumina (powder, 80 mesh), was heated at 200° C. for 3 hours. The catalyst contained about 30 percent of $MoO_3$. The weight ratio of limonene to catalyst was about 25, while that of limonene to solvent was about 1.1. The total yield of reaction was approximately 85 percent. The reaction products included:

| | Percent |
|---|---|
| 3-p-menthene | 9.3 |
| Trans-p-menthane | 10.4 |
| p-Cymene | 20 |

Higher boiling products comprised about 40 percent. Unreacted limonene was approximately 2 percent.

Oligomerization reactions of isoprene in batch and in continuous operations, are shown in Examples 5 through 8.

Example 5

An autoclave was heated at 200° C. for 1 hour while it contained 10 parts by volume of isoprene ($d=0.680$), 5 parts by volume of cyclohexane (solvent) and 0.2 part by weight of the nickel oxide-molybdenum oxide catalyst supported on silica-alumina (powder, 80 mesh). The catalyst contained about 30 percent of $MoO_3$. The weight ratio of isoprene to catalyst was about 34; the corresponding ratio of limonene to solvent was about 1.7. Total yield of reaction was approximately 50 percent. Reaction products included:

| | Percent |
|---|---|
| Dipentene | 30 |
| Diprene | 22 |

Example 6

In this illustration 10 parts by volume of isoprene, 5 parts (volume) of benzene (solvent) and 0.2 part by weight of the nickel oxide-molybdenum oxide catalyst supported on silica-alumina (powder, 80 mesh), were heated in an autoclave at 200° C. for 16 hours. The catalyst contained about 30 percent of $MoO_3$. Total reaction yield was about 60 percent. Primary reaction products were:

| | Percent |
|---|---|
| Dimethyl vinyl cyclohexenes | 17 |
| m-Cymene | 11 |
| p-Cymene | 10.6 |
| Trans-p-menthene | 11.5 |

Dipentene and diprene were completely absent, being disproportionated into p- and m-cymenes and trans-p-menthane. Generally, 3–5 hours are sufficient for obtaining the same products.

Example 7

29.4 parts by volume of isoprene were passed during a 45 minute period through a reactor containing 65 parts by volume of the nickel oxide-molybdenum oxide catalyst supported on silica-alumina. This catalyst contained about 6.6 percent of $MoO_3$. The conventional space velocity was about 0.6 vol./hour/vol. Temperature was approximately 300° C. Reaction products comprised 11 parts by weight, of which 4.4 parts by weight were unreacted isoprene. Total reaction yield was approximately 34 percent. Reaction products were:

| | Percent |
|---|---|
| p-Cymene | 8 |
| m-Cymene | 4 |
| 3-p-menthene | 2 |
| Cracking products | 18 |
| Dimethyl vinyl cyclohexenes | 3 |

*Example 8*

29.4 parts by volume of isoprene were passed during a 77 minute interval through a reactor containing 65 parts by volume of the same sample of catalyst mentioned in Example 7. Conventional space velocity was about 0.35 vol./hour/vol. Temperature was approximately 303° C. Reaction products comprised 13 parts by weight; unreacted isoprene was 0.83 part by weight. Total yield of reaction was about 61 percent. The main reaction products were:

| | Percent |
|---|---|
| p-Cymene | 22 |
| m-Cymene | 9.3 |
| 3-p-menthene | 5 |
| Dimethyl vinyl cyclohexenes | 5 |
| Cracking products | 15 |
| High boiling products | 5 |

Polymerization reactions are shown in Examples 9 through 11. In these reactions the nickel oxide-molybdenum oxide catalyst was supported on silica-alumina with 6 percent of $MoO_3$ being used. The catalyst was activated first with a stream of air at 500° C. for 25 hours. It was then reduced either by conventional methods or by passing 15 parts by volume of limonene at 300° C., with a space velocity of 0.5 vol./hour/vol., and finally washed several times with a dry solvent. The final valence state of molybdenum was 4.9.

*Example 9*

An autoclave was charged with 30 parts by volume of dry benzene (solvent), 15 parts (volume) of anhydrous isoprene and 1 part (weight) of the catalyst described immediately above. After the autoclave was charged, it was washed for 10 minutes with a stream of dry hydrogen free of oxygen in order to eliminate completely all air. It was then heated at 150° C. with stirring under autogenous pressure (about 4 atmospheres) for 15 hours. The autoclave was then allowed to cool to room temperature (about 22° C.), opened and a benzene solution of polymer and high-boiling products (dimers, etc.) was filtered from solids. The polymer was recovered by precipitation of the benzene solution with a volume of methanol ten times larger than that of the benzene solution, and with stirring of the resulting mixture. The solid polyisoprene was filtered, dried and weighed. Two parts by weight of solid polymer were so obtained, i.e., two parts per part by weight of catalyst. Unreacted isoprene was recovered.

*Example 10*

The autoclave was charged with 90 parts by volume of dry benzene (solvent), 45 parts (volume) of anhydrous isoprene, 2 parts (weight) of the catalyst of Example 9, and 0.5 part (weight) of hydroquinone. After charging the autoclave, it was washed for several minutes with a stream of dry hydrogen free of oxygen. It was heated at 150° C. with stirring under autogenous pressure. After about 3 hours, the pressure was 9 atmospheres, and decreased with time until it was 1 atmosphere. After 25 hours, the reactor was allowed to cool to room temperature (about 22° C.), opened and a benzene solution of polymer product so formed was filtered from solids. The polymer was recovered by precipitation of the benzene solution with methanol. The solid polyisoprene was filtered, dried and weighed. The solid polymer comprised 4.1 part (weight), corresponding to 2.1 part per part of catalyst used. Unreacted isoprene was recovered.

*Example 11*

The autoclave was charged with 100 parts by volume of anhydrous xylene and with 1 part (weight) of the catalyst of Example 9. It was then washed for 10 minutes with a hydrogen stream in order to eliminate air completely, leaving about 3 atmospheres of hydrogen in the reactor. Introduced into the reactor were 60 atmospheres of 98.5 percent of ethylene. The reactor was heated at 230° C. for 25 hours with stirring of the contents. The pressure observed during this period was about 130 atmospheres. The reactor was allowed to cool to room temperature (22° C.), opened and a benzene solution of polymer was filtered from solid. The polymer was recovered by precipitation of the benzene by stirring the latter with 10 volumes of methanol. Solid polyethylene was obtained by filtering the solution and drying it.

I claim:

1. A catalyst comprising an association of nickel oxide and molybdenum oxide supported on a carrier, containing from about 8 to about 40 percent by weight of $MoO_3$ (based upon the weight of supported catalyst), and formed by thermal decomposition of $$(NH_4)_6NiMo_9O_{32} \cdot 6H_2O$$

2. A catalyst of claim 1 characterized by an X-ray powder diffraction photograph with a very strong spacing (d) of 1.371 A.

3. A catalyst of claim 1 which has an atomic ratio of nickel to molybdenum of 1:9 and is a homogeneous, single phase material.

4. The catalyst of claim 1 wherein said nickel oxide is present in an amount of from about 0.4 to 8 percent by weight.

5. Process for preparing a catalytic material which comprises: impregnating a catalyst carrier with an aqueous solution of $(NH_4)_6NiMo_9O_{32} \cdot 6H_2O$; drying the impregnated carrier; and contacting the substantially dry impregnated carrier with air at a temperature from about 450° C. to about 550° C. for a period of about 10 to about 30 hours.

6. Process of claim 5 wherein air is so contacted at about 500° C. for about 20 hours.

References Cited by the Examiner

UNITED STATES PATENTS

| 2,486,361 | 10/1949 | Nahin et al. | 252—470 X |
| 2,880,171 | 3/1959 | Flinn et al. | 252—470 X |
| 2,983,691 | 5/1961 | Richardson | 252—470 X |

OSCAR R. VERTIZ, *Primary Examiner.*

G. OZAKI, *Assistant Examiner.*